March 29, 1932. C. C. RICHARD ET AL Re. 18,401

PUNCH AND DIE RETAINER

Original Filed Nov. 19, 1919

Inventors:
Clement C. Richard
Clarence A. Richard
deceased
Otis J. Richard
deceased
By Allied Products Corporation
assignee
BY Richard M. Hearne
Vice President
BY Charles E. Wilson
ATTORNEY.

Reissued Mar. 29, 1932 Re. 18,401

UNITED STATES PATENT OFFICE

CLEMENT C. RICHARD, OF BLOOMFIELD HILLS, AND CLARENCE A. RICHARD, DECEASED, AND OTIS K. RICHARD, DECEASED, BOTH LATE OF DETROIT, MICHIGAN, BY ALLIED PRODUCTS CORPORATION, OF DETROIT, MICHIGAN, A CORPORATION OF ILLINOIS, ASSIGNEE

PUNCH AND DIE RETAINER

Original No. 1,393,040, dated October 11, 1921, Serial No. 339,136, filed November 19, 1919. Application for reissue filed January 30, 1932. Serial No. 590,168.

This invention relates to tool retainers and the principal object of the invention is to provide a retainer means for the tool to prevent withdrawal thereof from the holder. The principal feature of the invention is involved in the provision of a retainer having an aperture for the tool shank and an angularly positioned aperture opening into the said first named aperture and containing a spring pressed ball partially extending into the tool retaining aperture to bindingly engage the shank of the tool and prevent withdrawal of the tool from the retainer. A further feature of the invention is involved in the construction of the tool shank in which a groove is formed to receive the ball, the groove in cross section having a radius equal to the radius of the ball and which when the ball is seated therein prevents rotation of the tool in relation to the retainer. And additional feature of the invention is involved in the peculiar character of the ball receiving groove which groove is arcuate in a plane parallel to the longitudinal axis of the tool and also in a plane at a right angle thereto, the radius of the latter form being equal to that of the ball whereby the tool is accurately positioned and held from rotative movement. Another feature of the invention resides in the provision of a punch and die retainer of the character above set forth in which the ball retaining aperture for the punch is positioned at an angle to the longitudinal axis of the punch and the ball retaining aperture for the die is positioned at an angle substantially opposite to that of the ball retaining aperture for the punch whereby the withdrawal movement of the punch from the die prevents the longitudinal movement of either tool in its holder and prevents the die from following the punch or the punch from remaining in the die. These and other objects and the several novel features of the invention are hereinafter more fully described and claimed and the preferred form of construction is shown in the accompanying drawings in which:—

Figure 1:
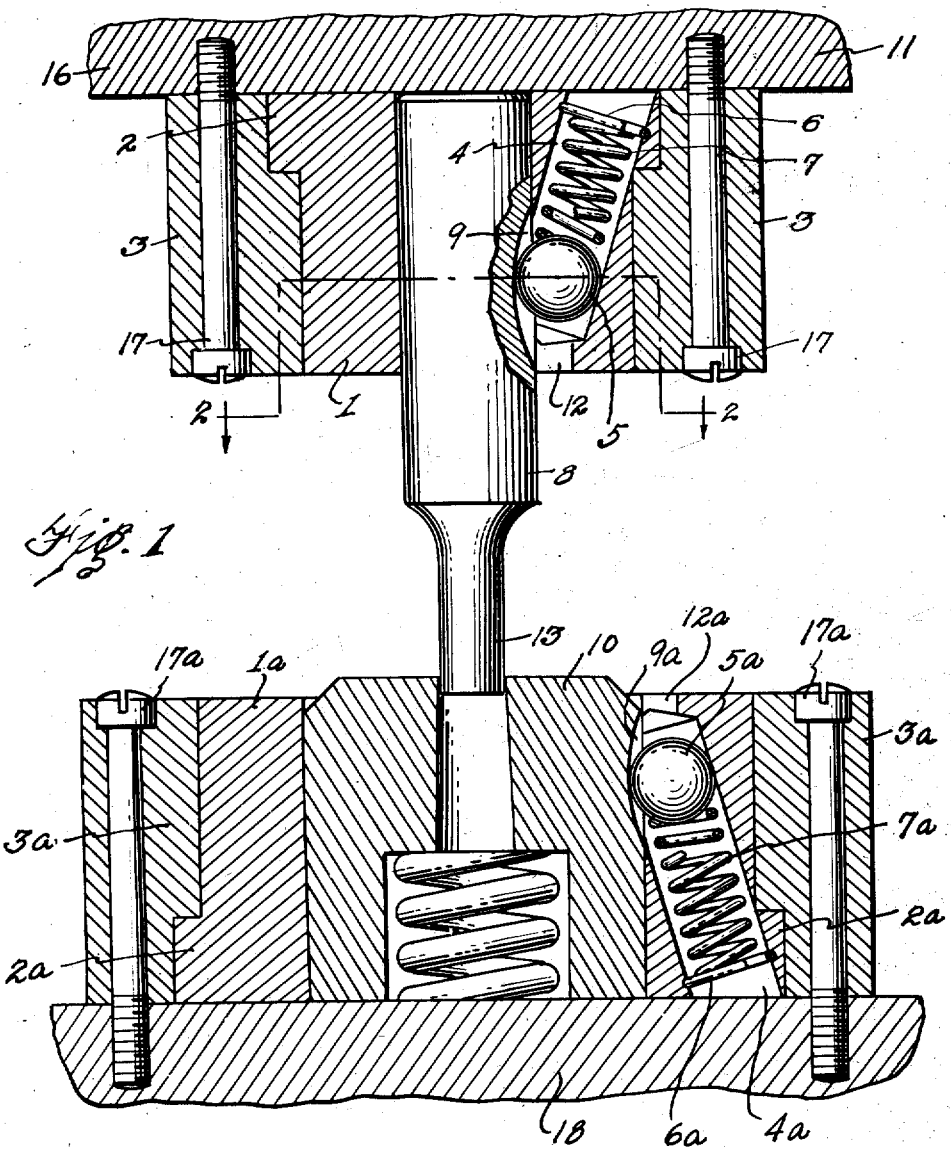
Figure 1 is a section through a punch and die and retainers therefor illustrating the means for securing a punch or die in the respective retainer.
Figure 2:
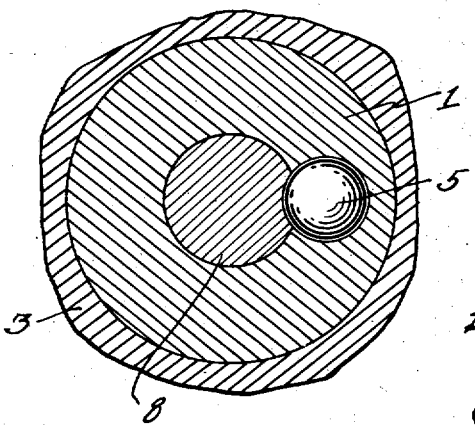
Figure 2 is a section through the punch and retainer taken on line 2—2 of Fig. 1.

We have preferably shown in the drawings a tool retainer as used with a punch and die and as will be noted the retainer 1 is formed with an annular flange 2 at the upper end thereof which is secured against the punch plate 16 by means of a member 3 fitting over the said annular flange and encircling the retainer and secured to the punch plate 16 by fillister head screws 17 shown in Fig. 1. In this manner the retainer is secured to the punch plate and held from rotation and as will be noted the retainer 1 is centrally apertured to receive the punch shank. Within the wall of the said retainer is an angularly positioned aperture 4 in which a ball 5 is positioned. Adjacent the end of the aperture opposite the ball is provided an annular groove in which is positioned a spring washer 6 against which one end of the spring 7 engages the opposite end of the spring engaging against the ball 5 as shown It is to be noted that the aperture 4 opens into the central aperture but that the opening between the two apertures is less than the diameter of the ball 5 thereby preventing the ball from passing out of the aperture 4 at the bottom. As will be noted from Fig. 1 the punch shank 8 is provided with a groove arcuate in a plane parallel with the longitudinal axis of the punch and also arcuate in a plane at a right angle to the aforesaid plane, the radius of the last named groove being equal to the radius of the ball 5. It can be seen more particularly from Fig. 2 that the ball 5 extends into the groove 9 in the punch shank and is tightly held in engagement therein by the spring 7, the opposite side of the ball at the same time engaging the angularly positioned wall of the aperture 4.

In the lower half of Fig. 1 is shown a die or die block 10 which is held in a retainer similar to that of the punch shank and this die block is provided with a groove 9*a* similar to the groove 9 in the punch shank. The retainer 1*a* is also provided with an angularly positioned aperture 4*a* in the wall thereof and a central aperture is provided therein to receive the die or die block 10. Within the aperture 4*a* is provided a spring washer 6*a* against which one end of the spring 7*a* engages, the opposite end of the said spring engaging the ball 5*a* which device is similar to that shown in the upper half of Fig. 1, being positioned at an opposite angle as shown. The spring 7*a* in like manner forces the ball into the arcuate groove 9*a* of the die or die block 10 and prevents the same from withdrawal from the retainer. The retainer is also provided with an annular flange 2*a* and a member 3*a* is provided similar to the member 3 encircling the retainer and providing in combination therewith an additional wall support for the block which aids in preventing breakage of the die block from the heavy blows delivered by the punch head.

The assembly of the device is as follows: The punch 8 is forced by the operator into the central aperture in the retainer 1 and when positioned as shown in Fig. 1, the ball 5 engages in the groove 9 in the punch shank preventing the punch from rotation in relation to the retainer and attempted withdrawal of the punch from the retainer is prevented by the binding action of the ball 5 between the angular wall of the aperture 4 and the wall of the arcuate groove 9 of the punch shank 8. It is to be noted that the end of the punch shank 8 engages against the punch plate 11 against which the retainer is secured so that upward movement of the punch is prevented and by the use of the spring pressed ball engaging in the arcuate groove in the punch shank the punch is locked in the retainer and is held immovable therein. This is also true of the die or die block 10, the said die being prevented from downward movement by the die plate 18 and prevented from rotation or upward movement by the spring pressed ball 5*a* engaging in the arcuate groove 9*a* in the die block. In order to remove either the punch or die from the respective retainer, the operator may extend a rod or similar instrument through the aperture 12 or 12*a* in the flat face of either retainer and force the ball 5 or 5*a* back into the aperture 4 or 4*a* away from and out of the arcuate groove 9 or 9*a* in the punch or die block respectively whereupon either the punch or die block may be easily withdrawn from the respective retainer. It will be noted that the retainers are not limited to use with any certain type of tool but may be used in different types of punch presses, drill presses and other machines where a tool must necessarily be held from rotation and at the same time from longitudinal movement in relation to the retainer or chuck within which it is secured. It is also to be noted that the groove 9 or 9*a* in the tool need not necessarily be arcuate in a plane parallel to the longitudinal axis of the tool this form being shown on account of greater ease of manufacture, the necessary characteristics of the groove being that the groove be arcuate in cross section on a radius equal to the radius of the ball so that when the ball is seated in the groove the tool is prevented from rotative movement. The bottom of the groove may be at an angle thereto or arcuate in form as shown, either form being adapted to be bindingly engaged by the spring pressed ball in the retainer wall to prevent either rotation or longitudinal movement of the tool. This retainer may be also used with square shank tools, the square shank fitting in a square aperture in the retainer thereby preventing rotation of the tool in relation to the retainer. The retainer may be made in different sizes with different central apertures as illustrated by the retainers 1 and 1*a* in Fig. 1 in the drawings to take tools of varying sizes and types. By positioning the angular apertures 4 and 4*a* shown in Fig. 1 at opposite angles, the tendency of the die block to travel with the punch is prevented and the tendency of the punch to remain in the die block is also prevented by the retainers here shown, the movement of the punch toward the die block or die block toward the punch being prevented by the wedging engagement of the ball 5 or 5*a* between the wall of the angular aperture and the wall of the arcuate groove in the tool.

From the foregoing description it becomes evident that the device is of a simple nature and accomplishes the objects desired and by the mechanism here shown the punch head 13 is held in position to exactly engage the aperture in the die block and thus a device is provided which is very efficient and exact in operation and which will not easily get out of order.

What we claim is:

1. In a retainer for punches, dies and similar tools, a base, a supporting member removably secured thereto and having a central aperture, a tool retainer held in position by the supporting member, the tool retainer having a central aperture, a spring-pressed ball supported by the retainer and normally extending into the aperture therein, the tool being adapted to fit in the aperture and seat against the base and having an arcuate groove of a radius greater than the radius of the ball in the face thereof in which the ball may engage to bind the tool in position.

2. In a retainer for punches, dies and similar tools, a base, a centrally apertured retainer detachably secured to the base, the retainer also having an angular aperture opening thereinto, a spring-pressed ball in the said angular aperture, and a tool having a shank provided with an arcuate groove of a radius greater than the radius of the ball in the side thereof engaged by the ball when the shank is seated against the base in the said aperture of the retainer.

3. In a retainer for punches, dies and similar tools, a base, a centrally apertured retainer removably secured to the base, the tool having a shank adapted for insertion in the aperture of the retainer into engagement with the base, the retainer also having an aperture in the wall thereof extending at an angle to the longitudinal axis of the central aperture and opening thereinto, there also being an opening in the retainer extending from the angular aperture through the face of the retainer, a ball fitting within the angular aperture, a spring forcing the ball to extend partially into the central aperture of the retainer, a recess formed in the surface of the tool shank having a face at an angle to the axis of the tool against which the ball engages when the shank is seated against the base, the aperture extending through the face of the retainer permitting insertion of an instrument to withdraw the ball from engagement with the tool.

4. In a retainer for punches, dies and similar tools, a base, a supporting member having a central circular aperture counterbored at the inner end adjacent the base, means for detachably securing the supporting member on the base, a retainer having a portion engaging in the enlarged part of the supporting member and fitting the aperture of the supporting member, said retainer having a central aperture and an aperture at an angle thereto opening into the central aperture, a spring-pressed ball in the angular aperture, and a tool having a notch formed in the face thereof, engaged by the ball when the tool is positioned in the central aperture of the retainer and seated against the base.

5. In a tool retainer, a base, a centrally apertured retainer detachably secured to the base, the retainer also having an angular aperture opening into the central aperture, a spring-pressed ball in the said angular aperture and a tool having a shank adapted for insertion in the central aperture to engage the base, said shank having an arcuate groove on one side only, said groove being arcuate in form both longitudinally and transversely of the axis of the shank, the groove transversely of the shank being at its deepest part substantially of the same radius as the ball and longitudinally being formed on an arc of a radius greater than the radius of the ball.

6. In a retainer for punches, dies and similar tools, a base, a centrally apertured retainer secured to the base, the tool having a shank adapted for insertion in said aperture, the retainer also having an aperture in the wall thereof extending at an angle to the longitudinal axis and opening into the central aperture, a spring-pressed ball in said aperture said tool shank provided with an arcuate groove in one side thereof of a radius greater than the radius of the ball in which the said ball engages.

7. In a retainer for punches, dies, and similar tools, a base, a centrally apertured retainer, removably secured to the base, the tool having a shank adapted for insertion in the aperture of the retainer into engagement with the base, the retainer also having an aperture in the wall thereof extending at an angle to the longitudinal axis of the central aperture and opening thereinto, there also being an opening in the retainer extending from the angular aperture through the face of the retainer, a ball fitting within the angular aperture, a spring forcing the ball to extend partially into the central aperture of the retainer, a recess formed in the surface of the tool shank having a face at an angle to the axis of the tool against which the ball engages when the shank is seated against the base, the opening extending through the face of the retainer permitting insertion of an instrument to withdraw the ball from engagement with the tool, the said ball being arranged for a wedging engagement with said angular face of the recess in the tool and with the retainer at any position of the tool relative to the retainer within a given range, so as to provide a lock against any withdrawal when the tool is in engagement with the said base, and whereby the tool is locked immovable in the retainer.

In testimony whereof we affix our signatures.

CLEMENT C. RICHARD.
ALLIED PRODUCTS CORPORATION,
*Assignee of the entire interest in the patent.*
By RICHARD M. HEAMES,